(12) United States Patent
Singh et al.

(10) Patent No.: US 12,328,474 B2
(45) Date of Patent: *Jun. 10, 2025

(54) METHODS AND APPARATUS TO CORRECT MISATTRIBUTIONS OF MEDIA IMPRESSIONS

(71) Applicant: The Nielsen Company (US), LLC, New York, NY (US)

(72) Inventors: Anil Pratap Singh, Batavia, IL (US); Matthew VanLandeghem, Schaumburg, IL (US); Lindsey Rabhan, San Francisco, CA (US)

(73) Assignee: The Nielsen Company (US), LLC, New York, NY (US)

(*) Notice: Subject to any disclaimer, the term of this patent is extended or adjusted under 35 U.S.C. 154(b) by 28 days.

This patent is subject to a terminal disclaimer.

(21) Appl. No.: 18/328,545

(22) Filed: Jun. 2, 2023

(65) Prior Publication Data

US 2023/0328316 A1 Oct. 12, 2023

Related U.S. Application Data

(63) Continuation of application No. 17/228,678, filed on Apr. 12, 2021, now Pat. No. 11,711,575, which is a
(Continued)

(51) Int. Cl.
*H04H 60/32* (2008.01)
*G06F 7/02* (2006.01)
(Continued)

(52) U.S. Cl.
CPC ......... *H04N 21/44218* (2013.01); *G06F 7/02* (2013.01); *G06Q 30/0204* (2013.01);
(Continued)

(58) Field of Classification Search
CPC ....... H04N 21/44218; H04N 21/25883; H04N 21/25891; H04N 21/44226;
(Continued)

(56) References Cited

U.S. PATENT DOCUMENTS 8,412,648 B2 4/2013 Karypis et al.
8,712,927 B2 4/2014 Danai et al.
(Continued)

OTHER PUBLICATIONS

Hansen, "The Truncated SVD as a Method for Regularization," Stanford University, Oct. 1986, 18 pages.
(Continued)

*Primary Examiner* — Jefferey F Harold
*Assistant Examiner* — Sahar Aqil Riaz

(57) ABSTRACT

Methods, apparatus, and articles of manufacture to correct misattributions of media impressions are disclosed. An example method includes obtaining first demographic-based impressions transmitted via a network in response to access to media by a first set of individuals, obtaining, from a database, second demographic-based impressions of the media accessed by a second set of individuals, and multiplying a vector of database proprietor impression data from the database by a pseudo-inverse matrix representative of misattribution data among a first and second set of individuals to calculate corrected demographic-based impression values.

20 Claims, 7 Drawing Sheets

Related U.S. Application Data continuation of application No. 16/673,711, filed on Nov. 4, 2019, now Pat. No. 10,979,764, which is a continuation of application No. 15/842,545, filed on Dec. 14, 2017, now Pat. No. 10,469,903.

(60) Provisional application No. 62/457,053, filed on Feb. 9, 2017.

(51) Int. Cl.
| | |
|---|---|
| *G06Q 30/0204* | (2023.01) |
| *G06Q 50/00* | (2012.01) |
| *H04H 60/29* | (2008.01) |
| *H04N 21/258* | (2011.01) |
| *H04N 21/442* | (2011.01) |
| *H04N 21/658* | (2011.01) |
| *H04N 21/84* | (2011.01) |
| *G06F 7/523* | (2006.01) |

(52) U.S. Cl.
CPC .............. *G06Q 50/01* (2013.01); *H04H 60/29* (2013.01); *H04N 21/25883* (2013.01); *H04N 21/25891* (2013.01); *H04N 21/44226* (2020.08); *H04N 21/6582* (2013.01); *H04N 21/84* (2013.01); *G06F 7/523* (2013.01)

(58) Field of Classification Search
CPC ...... H04N 21/6582; H04N 21/84; G06F 7/02; G06F 7/523; G06Q 30/0204; G06Q 50/01; H04H 60/29
USPC .......................................................... 725/14
See application file for complete search history.

(56) References Cited

U.S. PATENT DOCUMENTS

| | | | |
|---|---|---|---|
| 9,092,797 | B2 | 7/2015 | Perez et al. |
| 9,118,542 | B2 | 8/2015 | Srivastava et al. |
| 9,596,150 | B2 | 3/2017 | Kalus et al. |
| 9,749,688 | B1 | 8/2017 | West et al. |
| 9,983,776 | B1 | 5/2018 | Wu et al. |
| 10,270,673 | B1 | 4/2019 | Sheppard et al. |
| 10,469,903 | B2 | 11/2019 | Singh et al. |
| 10,956,947 | B2 * | 3/2021 | Seth .................. G06Q 30/0277 |
| 10,979,764 | B2 | 4/2021 | Singh et al. |
| 11,381,860 | B2 * | 7/2022 | Sheppard ........... G06Q 30/0204 |
| 2007/0087756 | A1 | 4/2007 | Hoffberg |
| 2009/0055862 | A1 | 2/2009 | Knoller et al. |
| 2010/0057576 | A1 | 3/2010 | Brodersen et al. |
| 2010/0161385 | A1 | 6/2010 | Karypis et al. |
| 2010/0317420 | A1 | 12/2010 | Hoffberg |
| 2012/0017232 | A1 | 1/2012 | Hoffberg et al. |
| 2012/0023522 | A1 * | 1/2012 | Anderson ............ H04H 20/106 725/35 |
| 2012/0072469 | A1 | 3/2012 | Perez et al. |
| 2013/0006816 | A1 | 1/2013 | Nuzzi et al. |
| 2014/0121476 | A1 | 5/2014 | Tran et al. |
| 2014/0324545 | A1 * | 10/2014 | Splaine .............. G06Q 30/0204 705/7.33 |
| 2015/0181290 | A1 * | 6/2015 | Arun .................. H04N 21/4532 725/16 |
| 2015/0189500 | A1 | 7/2015 | Bosworth et al. |
| 2015/0193816 | A1 | 7/2015 | Toupet et al. |
| 2015/0260849 | A1 | 9/2015 | Eastman |
| 2015/0262207 | A1 | 9/2015 | Rao et al. |
| 2015/0262397 | A1 | 9/2015 | Eastman |
| 2016/0055124 | A1 | 2/2016 | Galvin et al. |
| 2016/0191970 | A1 | 6/2016 | Sheppard et al. |
| 2016/0337701 | A1 * | 11/2016 | Khare .................. H04N 21/812 |
| 2017/0017975 | A1 | 1/2017 | Sheppard et al. |
| 2017/0091786 | A1 | 3/2017 | Sheppard et al. |
| 2017/0091794 | A1 | 3/2017 | Sheppard et al. |
| 2017/0118532 | A1 | 4/2017 | Sullivan et al. |
| 2017/0142465 | A1 | 5/2017 | Ray et al. |
| 2018/0055576 | A1 | 3/2018 | Koyrakh et al. |
| 2018/0227631 | A1 | 8/2018 | Singh et al. |
| 2020/0177955 | A1 | 6/2020 | Singh et al. |

OTHER PUBLICATIONS

United States Patent and Trademark Office, "Notice of Allowance," mailed in connection with U.S. Appl. No. 15/842,545, on Jun. 12, 2019, 8 pages.

United States Patent and Trademark Office, "Final Office Action," mailed in connection with U.S. Appl. No. 15/842,545, on Mar. 20, 2019, 8 pages.

United States Patent and Trademark Office, "Non-final Office Action," mailed in connection with U.S. Appl. No. 15/842,545, on Oct. 22, 2018, 6 pages.

United States Patent and Trademark Office, "Non-Final Office Action," issued in connection with U.S. Appl. No. 16/673,711, mailed on Jul. 2, 2020, 6 pages.

United States Patent and Trademark Office, "Notice of Allowance and Fee(s) Due," issued in connection with U.S. Appl. No. 16/673,711, mailed on Dec. 16, 2020, 7 pages.

United States Patent and Trademark Office, "Non-Final Office Action," issued in connection with U.S. Appl. No. 17/228,678, mailed on May 6, 2022, 11 pages.

United States Patent and Trademark Office, "Final Office Action," issued in connection with U.S. Appl. No. 17/228,678, mailed on Sep. 12, 2022, 10 pages.

United States Patent and Trademark Office, "Notice of Allowance and Fee(s) Due," issued in connection with U.S. Appl. No. 17/228,678, mailed on Mar. 2, 2023, 8 pages.

\* cited by examiner

METHODS AND APPARATUS TO CORRECT MISATTRIBUTIONS OF MEDIA IMPRESSIONS

CROSS REFERENCE TO RELATED APPLICATIONS

This patent arises from a continuation of U.S. patent application Ser. No. 17/228,678, filed on Apr. 12, 2021, now U.S. Pat. No. 11,711,575, which is a continuation of U.S. patent application Ser. No. 16/673,711, filed Nov. 4, 2019, now U.S. Pat. No. 10,979,764, which is a continuation of U.S. patent application Ser. No. 15/842,545, filed Dec. 14, 2017, now U.S. Pat. No. 10,469,903, which claims the benefit of U.S. Provisional Patent Application No. 62/457,053, filed Feb. 9, 2017. U.S. patent application Ser. No. 17/228,678, U.S. patent application Ser. No. 16/673,711, U.S. patent application Ser. No. 15/842,545, and U.S. Provisional Patent Application No. 62/457,053 are hereby incorporated herein by reference in their respective entireties.

FIELD OF THE DISCLOSURE

The present disclosure relates generally to monitoring media and, more particularly, to methods and apparatus to correct misattributions of media impressions.

BACKGROUND

Traditionally, audience measurement entities determine audience engagement levels for media based, in part, on media measurement data collected from registered panel members. That is, an audience measurement entity enrolls people who consent to being monitored into a panel. The audience measurement entity then monitors those panel members to determine media (e.g., television programs or radio programs, movies, DVDs, advertisements, streaming media, websites, etc.) presented to and/or near those panel members. In this manner, the audience measurement entity can determine exposure metrics for media based on the collected media measurement data.

DETAILED DESCRIPTION

Figure 1:
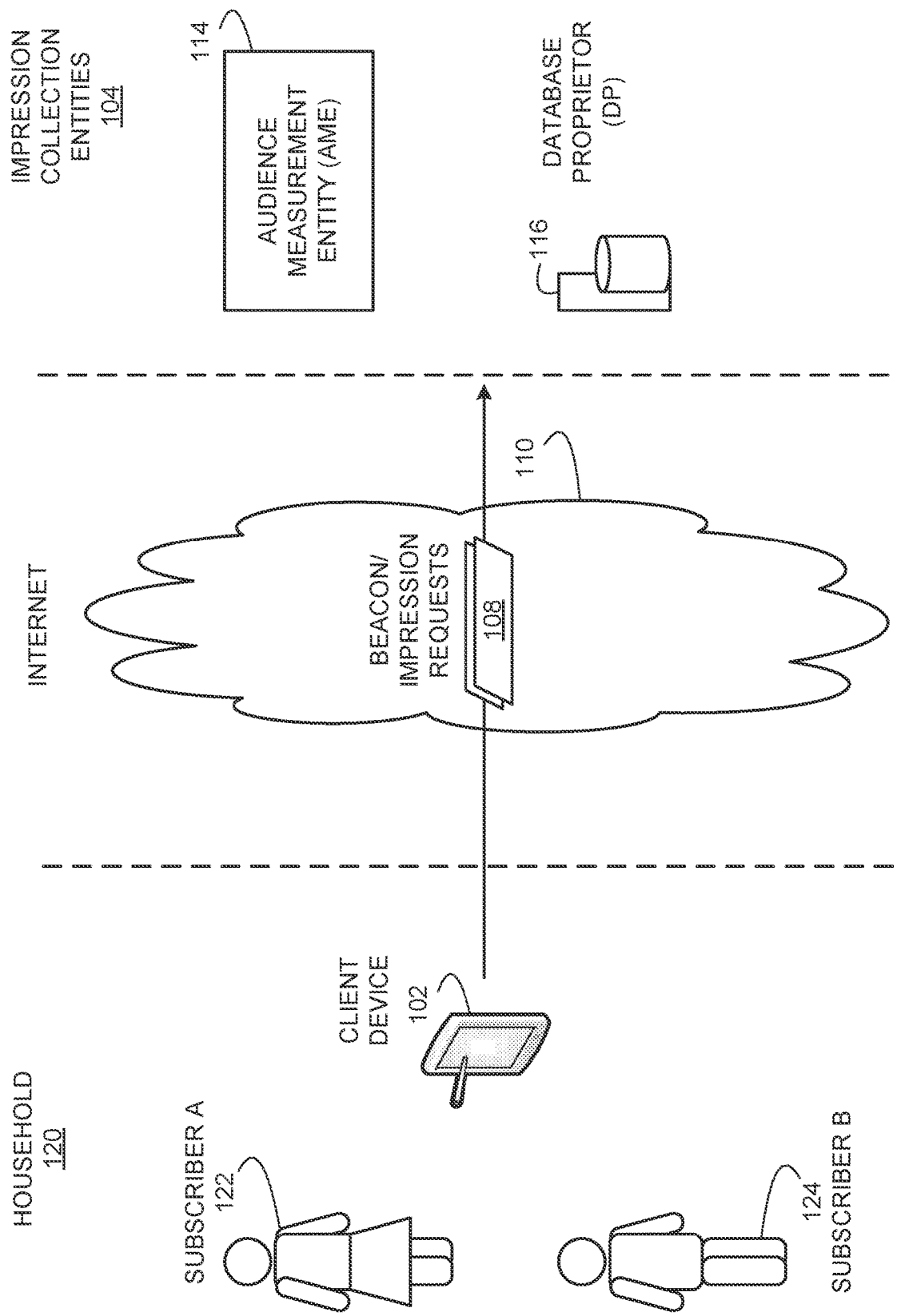
FIG. 1 illustrates an example environment in which an example client device operates to report audience impressions for media to impression collection entities to facilitate identifying total impressions and sizes of unique audiences exposed to different media.

Techniques for monitoring user access to Internet-accessible media such as web pages, advertisements, content and/or other media has evolved significantly over the years. At one point in the past, such monitoring was done primarily through server logs. In particular, entities serving media on the Internet would log the number of requests received for their media at their server and transmit the logged data to the audience measurement entity. Basing Internet usage research on server logs is problematic for several reasons. For example, server logs can be tampered with either directly or via zombie programs which repeatedly request media from the server to increase the server log counts. Secondly, media is sometimes retrieved once, cached locally and then repeatedly viewed from the local cache without involving the server in the repeat viewings. Server logs cannot track these views of cached media. Thus, server logs are susceptible to both over-counting and under-counting errors.

Techniques disclosed in U.S. Pat. No. 6,108,637, Blumenau, fundamentally changed the way Internet monitoring is performed and overcame the limitations of the server side log monitoring techniques described above. For example, Blumenau disclosed a technique wherein Internet media to be tracked is tagged with beacon instructions. In particular, monitoring instructions are associated with the HTML of the media to be tracked. When a client requests the media, both the media and the beacon instructions are downloaded to the client. The beacon instructions are, thus, executed whenever the media is accessed, be it from a server or from a cache.

The beacon instructions cause monitoring data reflecting information about the access to the media to be sent from the client that downloaded the media to a monitoring entity. Typically, the monitoring entity is an audience measurement entity (AME) that did not provide the media to the client and who is a trusted (e.g., neutral) third party for providing accurate usage statistics (e.g., The Nielsen Company, LLC). Advantageously, because the beaconing instructions are associated with the media and executed by the client browser whenever the media is accessed, the monitoring information is provided to the AME irrespective of whether the client is a panelist of the AME.

Audience measurement entities and/or other businesses often desire to link demographics to the monitoring information. To address this issue, the AME establishes a panel of users who have agreed to provide their demographic information and to have their Internet browsing activities monitored. When an individual joins the panel, they provide detailed information concerning their identity and/or demographics (e.g., gender, age, ethnicity, income, home location, occupation, etc.) to the AME. The AME sets a cookie on the panelist computer that enables the audience measurement entity to identify the panelist whenever the panelist accesses tagged media and, thus, sends monitoring information to the audience measurement entity.

While beacon usage provides rich information about the number of impressions, it lacks detailed information about the demographics associated with impressions for non-panelists. Since most of the clients providing monitoring information from the tagged media are not panelists and, thus, are unknown to the AME, statistical methods may be used to impute demographic information based on the data collected for panelists. The information may be used to impute information about a larger population of users providing data for the tagged media. However, panel sizes of audience measurement entities remain small compared to the general population of users. Thus, a problem is presented as to how to increase panel sizes while ensuring the demographics data of the panel is accurate.

There are many database proprietors (DPs) operating on the Internet. These DPs provide services to large numbers of subscribers. In exchange for the provision of the service, the subscribers register with the proprietor. As part of this registration, the subscribers provide detailed demographic information. Examples of such DPs include social network providers, email providers, etc. such as Facebook, Myspace, Twitter, Yahoo!, Google, etc. These DPs set cookies on the computers of their subscribers to enable the DP to recognize the user when they visit their website.

The protocols of the Internet make cookies inaccessible outside of a domain (e.g., Internet domain, domain name, etc.) on which they were set. Thus, a cookie set in the sample 123.com domain is accessible to servers in the sample 123.com domain, but not to servers outside that domain. Therefore, although an AME might find it advantageous to access the cookies set by the DPs, they are unable to do so.

Techniques disclosed in U.S. Pat. No. 8,370,489, Mainak et al., enable an audience measurement company to leverage the existing databases of DPs to collect more extensive Internet usage and demographic data by extending the beaconing process to encompass partnered DPs and by using such partners as interim data collectors. The techniques disclosed in Mainak et al. accomplish this task by responding to beacon requests from clients (who may not be a member of an audience member panel and, thus, may be unknown to the audience member entity) accessing tagged content by redirecting the client from the AME to a DP such as a social network site partnered with the audience member entity. The redirection initiates a communication session between the client accessing the tagged content and the DP. The DP (e.g., Facebook) can access any cookie it has set on the client to thereby identify the client based on the internal records of the DP. In the event the client is a subscriber of the DP, the DP logs the content impression in association with the demographics data of the client and subsequently forwards the log to the audience measurement company. In the event the client is not a subscriber of the DP, the DP redirects the client to the audience measurement company. The audience measurement company may then redirect the client to a second, different DP that is partnered with the AME. That second proprietor may then attempt to identify the client as explained above. This process of redirecting the client from DP to DP can be performed any number of times until the client is identified and the content exposure logged, or until all partners have been contacted without a successful identification of the client. The redirections all occur automatically so the user of the client is not involved in the various communication sessions and may not even know they are occurring.

The partnered DPs provide their logs and demographic information to the AME which then compiles the collected data into statistical reports accurately identifying the demographics of persons accessing the tagged content. Because the identification of clients is done with reference to enormous databases of users far beyond the quantity of persons present in a conventional audience measurement panel, the data developed from this process is extremely accurate, reliable and detailed.

Significantly, because the AME remains the first leg of the data collection process (e.g., receives the request generated by the beacon instructions from the client), the AME is able to obscure the source of the content access being logged as well as the identity of the content itself from the DPs (thereby protecting the privacy of the content sources), without compromising the ability of the DPs to log impressions for their subscribers. Further, the Internet security cookie protocols are complied with because the only servers that access a given cookie are associated with the Internet domain (e.g., Facebook.com) that set that cookie.

Examples disclosed in Mainak et al. (U.S. Pat. No. 8,370,489) can be used to determine any type of media impressions or exposures (e.g., content impressions, advertisement impressions, content exposure, and/or advertisement exposure) using demographic information, which is distributed across different databases (e.g., different website owners, service providers, etc.) on the Internet. Not only do such disclosed examples enable more accurate correlation of Internet advertisement exposure to demographics, but they also effectively extend panel sizes and compositions beyond persons participating in the panel of an AME and/or a ratings entity to persons registered in other Internet databases such as the databases of social medium sites such as Facebook, Twitter, Google, etc. Such extension effectively leverages the content tagging capabilities of the ratings entity and the use of databases of non-ratings entities such as social media and other websites to create an enormous, demographically accurate panel that results in accurate, reliable measurements of exposures to Internet content such as advertising and/or programming.

In some examples disclosed herein, media exposure is measured in terms of online Gross Rating Points. A Gross Rating Point (GRP) is a unit of measurement of audience size that has traditionally been used in the television ratings context. It is used to measure exposure to one or more media (e.g., programs, advertisements, etc.) without regard to multiple exposures of the same media to individuals. In terms of television (TV) advertisements, one GRP is equal to 1% of TV households. While GRPs have traditionally been used as a measure of television viewership, examples disclosed herein may be used in connection with generating online GRPs for online media to provide a standardized metric that can be used across the Internet to accurately reflect online advertisement exposure. Such standardized online GRP measurements can provide greater certainty to advertisers that their online advertisement money is well spent. It can also facilitate cross-medium comparisons such as viewership of TV advertisements and online advertisements. Because examples disclosed herein may be used to correct impressions that associate viewership measurements with corresponding demographics of users, the information processed using examples disclosed herein may also be used by advertisers to identify markets reached by their advertisements and/or to target particular markets with future advertisements.

Traditionally, audience measurement entities (also referred to herein as "ratings entities") determine demographic reach for advertising and media programming based on registered panel members. That is, an AME enrolls people that consent to being monitored into a panel. During enrollment, the AME receives demographic information from the enrolling people so that subsequent correlations may be made between advertisement/media exposure to those panelists and different demographic markets. Unlike traditional techniques in which audience measurement entities rely solely on their own panel member data to collect demographics-based audience measurement, example methods, apparatus, and/or articles of manufacture disclosed herein enable an AME to share demographic information with other entities that operate based on user registration models. As used herein, a user registration model is a model in which users subscribe to services of those entities by creating an account and providing demographic-related information about themselves. Sharing of demographic information associated with registered users of DPs enables an AME to extend or supplement their panel data with substantially reliable demographics information from external sources (e.g., DPs), thus extending the coverage, accuracy, and/or completeness of their demographics-based audience measurements. Such access also enables the AME to monitor persons who would not otherwise have joined an audience measurement panel. Any entity having a database identifying demographics of a set of individuals may cooperate with the AME. Such entities may be referred to as "DPs" and include entities such as Facebook, Google, Yahoo!, MSN, Twitter, Apple iTunes, Experian, etc.

To increase the likelihood that measured viewership is accurately attributed to the correct demographics, examples disclosed herein use demographic information located in the AME's records as well as demographic information located at one or more DPs that maintain records or profiles of users having accounts therewith. In this manner, examples disclosed herein may be used to supplement demographic information maintained by a ratings entity (e.g., an AME such as The Nielsen Company (US), LLC of Schaumburg, Illinois, United States of America, that collects media exposure measurements and/or demographics) with demographic information from one or more different DPs.

The use of demographic information from disparate data sources (e.g., high-quality demographic information from the panels of an audience measurement company and/or registered user data of web service providers) results in improved reporting effectiveness of metrics for both online and offline advertising campaigns. Example techniques disclosed herein use online registration data to identify demographics of users and use server impression counts, tagging (also referred to as beaconing), and/or other techniques to track quantities of impressions attributable to those users. Online web service providers such as social networking sites (e.g., Facebook) and multi-service providers (e.g., Yahoo!, Google, Experian, etc.) (collectively and individually referred to herein as online DPs) maintain detailed demographic information (e.g., age, gender, geographic location, race, income level, education level, religion, etc.) collected via user registration processes. An impression corresponds to a home or individual having been exposed to the corresponding media content and/or advertisement. Thus, an impression represents a home or an individual having been exposed to an advertisement or content or group of advertisements or content. In Internet advertising, a quantity of impressions or impression count is the total number of times an advertisement or advertisement campaign has been accessed by a web population (e.g., including number of times accessed as decreased by, for example, pop-up blockers and/or increased by, for example, retrieval from local cache memory).

Although such techniques for collecting media impressions are based on highly accurate demographic information, in some instances collected impressions may be misattributed to the wrong person and, thus, associated with incorrect demographic information. For example, in a household having multiple people that use the same client device (e.g., the same computer, tablet, smart internet appliance, mobile computing device), collected impressions from that client device may be misattributed to a member of the household that is not the current user of the client device. That is, when an online user visits a website and is exposed to an advertisement (or other media) on that site that has been tagged with beacon instructions, there is a redirect to a server of a DP (e.g., Facebook, Yahoo, Google, etc.). The DP then looks into the latest cookie in the web browser of that client device. The DP then attributes the impression to the user account corresponding to the cookie value. For example, the cookie value is one that was previously set in the client device by the DP as corresponding to a particular registered user account of the person logged into the website of that DP when the DP set the cookie. After collecting and attributing the impression to the user account associated with the retrieved cookie value, the DP aggregates the impressions and the audience based on the demographics associated with the user account. When this occurs over time and across many households, a significant number of collected impressions are misattributed to the wrong demographic information.

Misattribution is a measurement error that typically arises when impressions are collected from a same client device that is shared by multiple people in that a media impression caused by one person that is currently using the client device is incorrectly attributed to another person that previously used the same client device (or owns the device, or for some other reason is linked to the impression). Sharing of a client device can occur between two individuals who: (1) live in the same household, and/or (2) have access to the same client device. Misattribution occurs when, for a particular media exposure on a client device, a logged-in-user of a DP service (e.g., Facebook) is not the same as the current user of the client device that is being exposed to the media. For example, if person A visits the DP's website in the morning on a client device, but person B uses the same client device in the afternoon and gets exposed to an ad tagged with beacon instructions, the data provider would attribute the impression to person A since he/she was the last person to visit the DP's site, while actually it was person B who was at the client device when the media was presented.

Examples disclosed herein can be used to correct misattribution in collected impressions by creating a matrix of misattribution correction factors that can be applied to (e.g., multiplied with) a vector $\vec{d}$ of DP impression data to obtain a vector $\vec{t}$ of estimated true impression data. An example method of creating the matrix of misattribution correction factors is disclosed herein. As disclosed herein, the total of adjusted impressions number remains the same after correcting the data for misattribution errors. That is, the total number of impressions is not changed, but the impressions are, instead, redistributed amongst.

Examples disclosed herein may be implemented by an AME (e.g., any entity interested in measuring or tracking audience exposures to advertisements, content, and/or any other media) in cooperation with any number of DPs such as online web services providers. Such DPs/online web services providers may be social network sites (e.g., Facebook, Twitter, MySpace, etc.), multi-service sites (e.g., Yahoo!, Google, Experian, Axiom, Catalina, etc.), online retailer sites (e.g., Amazon.com, Buy.com, etc.), and/or any other web service(s) site that maintains user registration records.

Additional examples are disclosed below in which example DPs are shown as Facebook (FB), Yahoo (Y), and Google. In the below examples, misattribution adjustment factors are calculated for each site and demographic group based on a cross-platform television and personal computer (TVPC) panel of the AME. The illustrated examples are based on three months of historical data. However, any other amount of data may be used. Adjustment factors are then applied to the campaign data from a DP to adjust impression data for the modeled misattribution.

While, for clarity, the following examples are described with reference to beacons and/or cookies to collect impression data, it should be understood that any other method, technique, tool, etc. may be used to collect AME impression data and/or DP impression data.

FIG. 1 illustrates an example client device 102 that reports audience impressions for media to impression collection entities 104 to facilitate identifying total impressions and sizes of unique audiences exposed to different media. As used herein, the term impression collection entity refers to any entity that collects impression data. The client device 102 of the illustrated example may be any device capable of accessing media over a network. For example, the client device 102 may be a mobile phone, a mobile communication device, a tablet, a gaming device, a portable media presentation device, an internet appliance, a smart television, an internet terminal, a computer, or any other device capable of presenting media received via network communications. Examples disclosed herein may be used to collect impression information for any type of media including content and/or advertisements. Media may include advertising and/or content such as web pages, streaming video, streaming audio, movies, and/or any other type of content and/or advertisement deliver via satellite, broadcast, cable television, radio frequency (RF) terrestrial broadcast, Internet (e.g., internet protocol television (IPTV)), television broadcasts, radio broadcasts and/or any other vehicle for delivering media. In some examples, media includes user-generated media that is, for example, uploaded to media upload sites such as YouTube and subsequently downloaded and/or streamed by one or more client devices for playback. Media may also include advertisements. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s) of any type(s).

In the illustrated example, the client device 102 employs a web browser and/or applications (e.g., apps) to access media, some of which include instructions that cause the client device 102 to report media monitoring information to one or more of the impression collection entities 104. That is, when the client device 102 of the illustrated example accesses media, a web browser and/or application of the client device 102 executes instructions in the media to send a beacon request or impression request 108 to one or more of the impression collection entities 104 via, for example, the Internet 110. The beacon requests 108 of the illustrated example include information about accesses to media at the client device 102. Such beacon requests 108 allow monitoring entities, such as the impression collection entities 104, to collect impressions for different media accessed via the client device 102. In this manner, the impression collection entities 104 can generate large impression quantities for different media (e.g., different content and/or advertisement campaigns).

The impression collection entities 104 of the illustrated example include an example AME (AME) 114 and an example DP (DP) 116. In the illustrated example, the AME 114 does not provide the media to the client device 102 and is a trusted (e.g., neutral) third party (e.g., The Nielsen Company (US), LLC) for providing accurate media access statistics. In the illustrated example, the DP 116 is one of many DPs that operates on the Internet to provide services to large numbers of subscribers. Such services may be email services, social networking services, news media services, cloud storage services, streaming music services, streaming video services, online retail shopping services, credit monitoring services, etc. Example DPs include social network sites (e.g., Facebook, Twitter, MySpace, etc.), multi-service sites (e.g., Yahoo!, Google, etc.), online retailer sites (e.g., Amazon.com, Buy.com, etc.), credit reporting services (e.g., Experian) and/or any other web service(s) site that maintains user registration records. In examples disclosed herein, the DP 116 maintains user account records corresponding to users registered for Internet-based services provided by the DPs. That is, in exchange for the provision of services, subscribers register with the DP 116. As part of this registration, the subscribers provide detailed demographic information to the DP 116. Demographic information may include, for example, gender, age, ethnicity, income, home location, education level, occupation, etc. In the illustrated example, the DP 116 sets a device/user identifier (e.g., an identifier described below in connection with FIG. 2) on a subscriber's client device 102 that enables the DP 116 to identify the subscriber.

In the illustrated example, when the DP 116 receives a beacon/impression request 108 from the client device 102, the DP 116 requests the client device 102 to provide the device/user identifier that the DP 116 had previously set for the client device 102. The DP 116 uses the device/user identifier corresponding to the client device 102 to identify demographic information in its user account records corresponding to the subscriber of the client device 102. In this manner, the DP 116 can generate demographic impressions by associating demographic information with an audience impression for the media accessed at the client device 102. As explained above, a demographic impression is an impression that is associated with a characteristic (e.g., a demographic characteristic) of the person exposed to the media.

In the illustrated example, the AME 114 establishes an AME panel of users who have agreed to provide their demographic information and to have their Internet browsing activities monitored. When an individual joins the AME panel, the person provides detailed information concerning the person's identity and demographics (e.g., gender, age, ethnicity, income, home location, occupation, etc.) to the AME 114. The AME 114 sets a device/user identifier (e.g., an identifier described below in connection with FIG. 2) on the person's client device 102 that enables the AME 114 to identify the panelist. An AME panel may be a cross-platform TVPC panel built and maintained by the AME 114. In other examples, the AME panel may be a computer panel or internet-device panel without corresponding to a television audience panel. In yet other examples, the AME panel may be a cross-platform radio/computer panel and/or a panel formed for other mediums.

In the illustrated example, when the AME 114 receives a beacon request 108 from the client device 102, the AME 114 requests the client device 102 to provide the AME 114 with the device/user identifier that the AME 114 previously set in the client device 102. The AME 114 uses the device/user identifier corresponding to the client device 102 to identify demographic information in its user AME panelist records corresponding to the panelist of the client device 102. In this manner, the AME 114 can generate demographic impressions by associating demographic information with an audience impression for the media accessed at the client device 102.

In the illustrated example, the client device 102 is used in an example household 120 in which household members 122 and 124 (identified as subscriber A 122 and subscriber B 124) are subscribers of an internet-based service offered by the DP 116. In the illustrated example, subscriber A 122 and subscriber B 124 share the client device 102 to access the internet-based service of the DP 116 and to access other media via the Internet 110. In the illustrated example, when the DP 116 receives a beacon/impression request 108 for media accessed via the client device 102, the DP 116 logs an impression for the media access as corresponding to the subscriber 122, 124 of the household 120 that most recently logged into the DP 116. Misattributions of impressions logged by the DP 116 are likely to occur in circumstances similar to the example household 120 of FIG. 1 in which multiple people in a household share a client device. For example, if the subscriber A 122 logs into a service of the DP 116 on the client device 102, and the subscriber B 124 subsequently uses the client device 102 without logging in to the service of the DP 116, the DP 116 attributes logged impression to the subscriber A 122 even though the use is actually by subscriber B 124 because the subscriber A 122 was the last person to log into the DP 116 and, thus, the subscriber A 122 was most recently identified by the DP 116 as the subscriber using the client device 102. As such, even though the subscriber B 124 was subsequently using the client device 102, impressions logged by the DP 116 during such use are not attributed to the correct person (i.e., the subscriber B 124) because the most recent login detected by the DP 116 corresponded to the subscriber A 122. In the illustrated example, logins are used by the DP 116 to identify subscribers using particular devices by associating device/user identifiers on the client devices with subscriber accounts at the DP 116 corresponding to usernames used during the logins. As such, the DP 116 assumes that the most recent login is indicative of a subscriber using the client device 102 until another login event is received at the DP 116 that identifies a different subscriber. Such assumptions based on the most recent login lead to the above-described misattributions.

Figure 2:
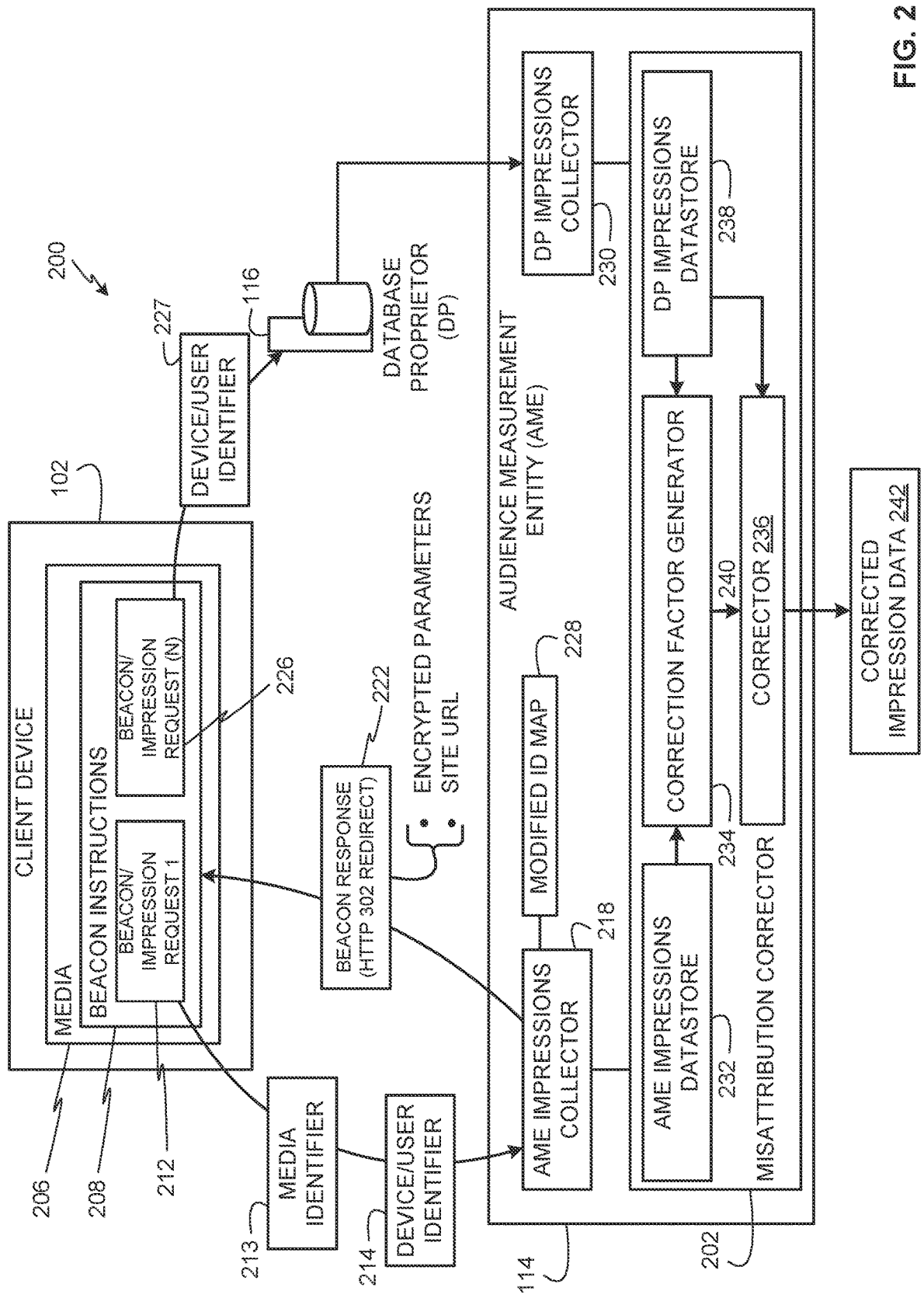
FIG. 2 is an example block diagram including an example communication flow in which an audience measurement entity (AME) and a database proprietor (DP) can collect impressions and demographic information based on a client device reporting impressions to the AME and the DP.

FIG. 2 illustrates an example communication flow within a system 200 in which the example AME 114 and the example DP 116 of FIG. 1 collect impressions and demographic information based on the client device 102 reporting impressions to the AME 114 and the DP 116. The example system 200 of FIG. 2 also includes an example misattribution corrector 202. The misattribution corrector 202 of the illustrated example corrects unique audience sizes and impression counts that are based on impressions reported by client devices (e.g., the client device 102) and for which the DP 116 has misattributed some of those impressions to incorrect people and, thus, incorrect demographic information. The example chain of events shown in FIG. 2 occurs when the client device 102 accesses media for which the client device 102 reports an impression to the AME 114 and the DP 116. In some examples, the client device 102 reports impressions for accessed media based on instructions (e.g., beacon instructions) embedded in the media that instruct the client device 102 (e.g., instruct a web browser or an app in the client device 102) to send beacon/impression requests (e.g., the beacon/impression requests 108 of FIG. 1) to the AME 114 and/or the DP 116. In such examples, the media having the beacon instructions is referred to as tagged media. In other examples, the client device 102 reports impressions for accessed media based on instructions embedded in apps or web browsers that execute on the client device 102 to send beacon/impression requests (e.g., the beacon/impression requests 108 of FIG. 1) to the AME 114, and/or the DP 116 for corresponding media accessed via those apps or web browsers. In any case, the beacon/impression requests (e.g., the beacon/impression requests 108 of FIG. 1) include device/user identifiers (e.g., AME IDs and/or DP IDs) as described further below to allow the corresponding AME 114 and/or DP 116 to associate demographic information with resulting logged impressions.

In the illustrated example, the client device 102 accesses media 206 that is tagged with beacon instructions 208. The beacon instructions 208 cause the client device 102 to send a beacon/impression request 212 to an AME impressions collector 218 when the client device 102 accesses the media 206. For example, a web browser and/or app of the client device 102 executes the beacon instructions 208 in the media 206 which instruct the browser and/or app to generate and send the beacon/impression request 212. In the illustrated example, the client device 102 sends the beacon/impression request 212 to the AME impression collector 218 using an HTTP (hypertext transfer protocol) request addressed to the URL (uniform resource locator) of the AME impressions collector 218 at, for example, a first internet domain of the AME 114. The beacon/impression request 212 of the illustrated example includes a media identifier 213 (e.g., an identifier that can be used to identify content, an advertisement, and/or any other media) corresponding to the media 206. In some examples, the beacon/impression request 212 also includes a site identifier (e.g., a URL) of the website that served the media 206 to the client device 102 and/or a host website ID (e.g., www.acme.com) of the website that displays or presents the media 206. In the illustrated example, the beacon/impression request 212 includes a device/user identifier 214. In the illustrated example, the device/user identifier 214 that the client device 102 provides in the beacon impression request 212 is an AME ID because it corresponds to an identifier that the AME 114 uses to identify a panelist corresponding to the client device 102. In other examples, the client device 102 may not send the device/user identifier 214 until the client device 102 receives a request for the same from a server of the AME 114 (e.g., in response to, for example, the AME impressions collector 218 receiving the beacon/impression request 212).

In some examples, the device/user identifier 214 may be a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, and/or any other identifier that the AME 114 stores in association with demographic information about users of the client devices 102. When the AME 114 receives the device/user identifier 214, the AME 114 can obtain demographic information corresponding to a user of the client device 102 based on the device/user identifier 214 that the AME 114 receives from the client device 102. In some examples, the device/user identifier 214 may be encrypted (e.g., hashed) at the client device 102 so that only an intended final recipient of the device/user identifier 214 can decrypt the hashed identifier 214. For example, if the device/user identifier 214 is a cookie that is set in the client device 102 by the AME 114, the device/user identifier 214 can be hashed so that only the AME 114 can decrypt the device/user identifier 214. If the device/user identifier 214 is an IMEI number, the client device 102 can hash the device/user identifier 214 so that only a wireless carrier (e.g., the DP 116) can decrypt the hashed identifier 214 to recover the IMEI for use in accessing demographic information corresponding to the user of the client device 102. By hashing the device/user identifier 214, an intermediate party (e.g., an intermediate server or entity on the Internet) receiving the beacon request cannot directly identify a user of the client device 102.

In response to receiving the beacon/impression request 212, the AME impressions collector 218 logs an impression for the media 206 by storing the media identifier 213 contained in the beacon/impression request 212. In the illustrated example of FIG. 2, the AME impressions collector 218 also uses the device/user identifier 214 in the beacon/impression request 212 to identify AME panelist demographic information corresponding to a panelist of the client device 102. That is, the device/user identifier 214 matches a user ID of a panelist member (e.g., a panelist corresponding to a panelist profile maintained and/or stored by the AME 114). In this manner, the AME impressions collector 218 can associate the logged impression with demographic information of a panelist corresponding to the client device 102. The AME impressions collector 218 stores the logged impression and demographic information in an AME impressions datastore 232.

In some examples, the beacon/impression request 212 may not include the device/user identifier 214 if, for example, the user of the client device 102 is not an AME panelist. In such examples, the AME impressions collector 218 logs impressions regardless of whether the client device 102 provides the device/user identifier 214 in the beacon/impression request 212 (or in response to a request for the identifier 214). When the client device 102 does not provide the device/user identifier 214, the AME impressions collector 218 will still benefit from logging an impression for the media 206 even though it will not have corresponding demographics. For example, the AME 114 may still use the logged impression to generate a total impressions count and/or a frequency of impressions (e.g., an impressions frequency) for the media 206. Additionally or alternatively, the AME 114 may obtain demographics information from the DP 116 for the logged impression if the client device 102 corresponds to a subscriber of the DP 116.

In the illustrated example of FIG. 2, to compare or supplement panelist demographics (e.g., for accuracy or completeness) of the AME 114 with demographics from one or more DPs (e.g., the DP 116), the AME impressions collector 218 returns a beacon response message 222 (e.g., a first beacon response) to the client device 102 including an HTTP "302 Found" re-direct message and a URL of a participating DP 116 at, for example, a second internet domain. In the illustrated example, the HTTP "302 Found" re-direct message in the beacon response 222 instructs the client device 102 to send a second beacon request 226 to the DP 116. In other examples, instead of using an HTTP "302 Found" re-direct message, redirects may be implemented using, for example, an iframe source instruction (e.g., <iframe src=" ">) or any other instruction that can instruct a client device to send a subsequent beacon request (e.g., the second beacon request 226) to a participating DP 116. In the illustrated example, the AME impressions collector 218 determines the DP 116 specified in the beacon response 222 using a rule and/or any other suitable type of selection criteria or process. In some examples, the AME impressions collector 218 determines a particular DP to which to redirect a beacon request based on, for example, empirical data indicative of which DP is most likely to have demographic data for a user corresponding to the device/user identifier 214. In some examples, the beacon instructions 208 include a predefined URL of one or more DPs to which the client device 102 should send follow up beacon requests 226. In other examples, the same DP is always identified in the first redirect message (e.g., the beacon response 222).

In the illustrated example of FIG. 2, the beacon/impression request 226 may include a device/user identifier 227 that is a DP ID because it is used by the DP 116 to identify a subscriber of the client device 102 when logging an impression. In some instances (e.g., in which the DP 116 has not yet set a DP ID in the client device 102), the beacon/impression request 226 does not include the device/user identifier 227. In some examples, the DP ID is not sent until the DP requests the same (e.g., in response to the beacon/impression request 226). In some examples, the device/user identifier 227 is a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, and/or any other identifier that the DP 116 stores in association with demographic information about subscribers corresponding to the client devices 102. When the DP 116 receives the device/user identifier 227, the DP 116 can obtain demographic information corresponding to a user of the client device 102 based on the device/user identifier 227 that the DP 116 receives from the client device 102. In some examples, the device/user identifier 227 may be encrypted (e.g., hashed) at the client device 102 so that only an intended final recipient of the device/user identifier 227 can decrypt the hashed identifier 227. For example, if the device/user identifier 227 is a cookie that is set in the client device 102 by the DP 116, the device/user identifier 227 can be hashed so that only the DP 116 can decrypt the device/user identifier 227. If the device/user identifier 227 is an IMEI number, the client device 102 can hash the device/user identifier 227 so that only a wireless carrier (e.g., the DP 116) can decrypt the hashed identifier 227 to recover the IMEI for use in accessing demographic information corresponding to the user of the client device 102. By hashing the device/user identifier 227, an intermediate party (e.g., an intermediate server or entity on the Internet) receiving the beacon request cannot directly identify a user of the client device 102. For example, if the intended final recipient of the device/user identifier 227 is the DP 116, the AME 114 cannot recover identifier information when the device/user identifier 227 is hashed by the client device 102 for decrypting only by the intended DP 116.

In some examples that use cookies as the device/user identifier 227, when a user deletes a DP cookie from the client device 102, the DP 116 sets the same cookie value in the client device 102 the next time the user logs into a service of the DP 116. In such examples, the cookies used by the DP 116 are registration-based cookies, which facilitate setting the same cookie value after a deletion of the cookie value has occurred on the client device 102. In this manner, the DP 116 can collect impressions for the client device 102 based on the same cookie value over time to generate unique audience (UA) sizes while eliminating or substantially reducing the likelihood that a single unique person will be counted as two or more separate unique audience members.

Although only a single DP 116 is shown in FIGS. 1 and 2, the impression reporting/collection process of FIGS. 1 and 2 may be implemented using multiple DPs. In some such examples, the beacon instructions 208 cause the client device 102 to send beacon/impression requests 226 to numerous DPs. For example, the beacon instructions 208 may cause the client device 102 to send the beacon/impression requests 226 to the numerous DPs in parallel or in daisy chain fashion. In some such examples, the beacon instructions 208 cause the client device 102 to stop sending beacon/impression requests 226 to DPs once a DP has recognized the client device 102. In other examples, the beacon instructions 208 cause the client device 102 to send beacon/impression requests 226 to DPs so that multiple DPs can recognize the client device 102 and log a corresponding impression. In any case, multiple DPs are provided the opportunity to log impressions and provide corresponding demographics information if the user of the client device 102 is a subscriber of services of those DPs.

In some examples, prior to sending the beacon response 222 to the client device 102, the AME impressions collector 218 replaces site IDs (e.g., URLs) of media provider(s) that served the media 206 with modified site IDs (e.g., substitute site IDs) which are discernable only by the AME 114 to identify the media provider(s). In some examples, the AME impressions collector 218 may also replace a host website ID (e.g., www.acme.com) with a modified host site ID (e.g., a substitute host site ID) which is discernable only by the AME 114 as corresponding to the host website via which the media 206 is presented. In some examples, the AME impressions collector 218 also replaces the media identifier 213 with a modified media identifier 213 corresponding to the media 206. In this way, the media provider of the media 206, the host website that presents the media 206, and/or the media identifier 213 are obscured from the DP 116, but the DP 116 can still log impressions based on the modified values which can later be deciphered by the AME 114 after the AME 114 receives logged impressions from the DP 116. In some examples, the AME impressions collector 218 does not send site IDs, host site IDs, the media identifier 213 or modified versions thereof in the beacon response 222. In such examples, the client device 102 provides the original, non-modified versions of the media identifier 213, site IDs, host IDs, etc. to the DP 116.

In the illustrated example, the AME impression collector 218 maintains a modified ID mapping table 228 that maps original site IDs with modified (or substitute) site IDs, original host site IDs with modified host site IDs, and/or maps modified media identifiers to the media identifiers such as the media identifier 213 to obfuscate or hide such information from DPs such as the DP 116. Also in the illustrated example, the AME impressions collector 218 encrypts all of the information received in the beacon/impression request 212 and the modified information to prevent any intercepting parties from decoding the information. The AME impressions collector 218 of the illustrated example sends the encrypted information in the beacon response 222 to the client device 102 so that the client device 102 can send the encrypted information to the DP 116 in the beacon/impression request 226. In the illustrated example, the AME impressions collector 218 uses an encryption that can be decrypted by the DP 116 site specified in the HTTP "302 Found" re-direct message.

Periodically or aperiodically, the impression data collected by the DP 116 is provided to a DP impressions collector 230 of the AME 114 as, for example, batch data. The DP impressions collector 230 stores the received impressions data in a DP impressions datastore 238. As discussed above, some impressions logged by the client device 102 to the DP 116 are misattributed by the DP 116 to a wrong subscriber and, thus, to incorrect demographic information. During a data collecting and merging process to combine demographic and impression data from the AME 114 and the DP 116, demographics of impressions logged by the AME 114 for the client device 102 will not correspond to demographics of impressions logged by the DP 116 because the DP 116 has misattributed some impressions to the incorrect demographic information. Examples disclosed herein may be used to determine an impressions adjustment factor to correct/adjust impression-based data (e.g., total impressions and unique audience size) provided by the DP 116.

Additional examples that may be used to implement the beacon instruction processes of FIG. 2 are disclosed in Mainak et al., U.S. Pat. No. 8,370,489. In addition, other examples that may be used to implement such beacon instructions are disclosed in Blumenau, U.S. Pat. No. 6,108,637.

In the example of FIG. 2, the AME 114 includes the example misattribution corrector 202 to correct unique audience values and impression counts that are based on impressions reported by client devices (e.g., the client device 102) for which the DP 116 may have misattributed some of the impressions to incorrect demographic information. The misattribution corrector 202 of the illustrated example is provided with the example AME impressions datastore 232, the example DP impressions datastore 238, an example correction factor generator 234, and an example corrector 236.

The example correction factor generator 234 forms a matrix 240 of misattribution correction factors. An example method of forming the matrix 240 is disclosed herein. In the disclosed example, AME impression data stored in the AME impressions datastore 232 and DP impression data stored in the DP impressions datastore 238 may be used to form the matrix 240. For example, AME impressions collected using a panel and using data from panelists (e.g., logins) may be used to obtain truth data. The truth data can be compared with DP impressions to estimate how a DP would report impression demographics for the panel.

As further disclosed herein, the example corrector 236 may multiply the matrix 240 by a vector $\vec{d}$ of DP impression data from the DP impressions datastore 238 to form a vector $\vec{t}$ of corrected impression data 242 that is intended to be more accurate than the original DP impression data stored in the DP impressions datastore 238. The vector $\vec{t}$ of corrected impression data 242 is often referred to as containing true data or truth data as it represents at least partially corrected data, even though it may not be 100% accurate.

While an example manner of implementing the example misattribution corrector 202, the example impressions collector 218, the example DP impressions collector 230, the example correction factor generator 234, and the example corrector 236 is illustrated in FIG. 2, one or more of the elements, processes and/or devices illustrated in FIG. 2 may be combined, divided, re-arranged, omitted, eliminated and/or implemented in any other way. Further, the example misattribution corrector 202, the example AME impressions collector 218, the example DP impressions collector 230, the example correction factor generator 234, and the example corrector 236 of FIG. 2 may be implemented by hardware, software, firmware and/or any combination of hardware, software, and/or firmware. Thus, for example, any of the example misattribution corrector 202, the example AME impressions collector 218, the example DP impressions collector 230, the example correction factor generator 234, and the example corrector 236 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example misattribution corrector 202, the example AME impressions collector 218, the example DP impressions collector 230, the example correction factor generator 234, and the example corrector 236 is/are hereby expressly defined to include a tangible computer readable storage device or storage disk such as a memory, a digital versatile disk (DVD), a compact disk (CD), a Blu-ray disk, etc. storing the software and/or firmware. Further still, the example misattribution corrector 202, the example impressions collector 218, the example DP impressions collector 230, the example correction factor generator 234, and the example corrector 236 of FIG. 2 may include one or more elements, processes and/or devices in addition to, or instead of, those illustrated in FIG. 2, and/or may include more than one of any or all of the illustrated elements, processes and devices.

FIGS. 3-6 are flow diagrams representative of machine readable instructions that may be executed to implement the misattribution corrector 202 of FIG. 2 to reduce impression misattributions from the DP impressions datastore 238. In these examples, the machine readable instructions comprise one or more programs for execution by a processor such as the processor 712 shown in the example processor platform 700 discussed below in connection with FIG. 7. The program(s) may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program(s) is/are described with reference to the flowcharts illustrated in FIGS. 3-6, many other methods of implementing the example misattribution corrector 202 may alternatively be used. For example, the order of execution of the blocks may be changed, and/or some of the blocks described may be changed, eliminated, or combined.

As mentioned above, the example process(es) of FIGS. 3-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instance s, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process(es) of FIGS. 3-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 3:
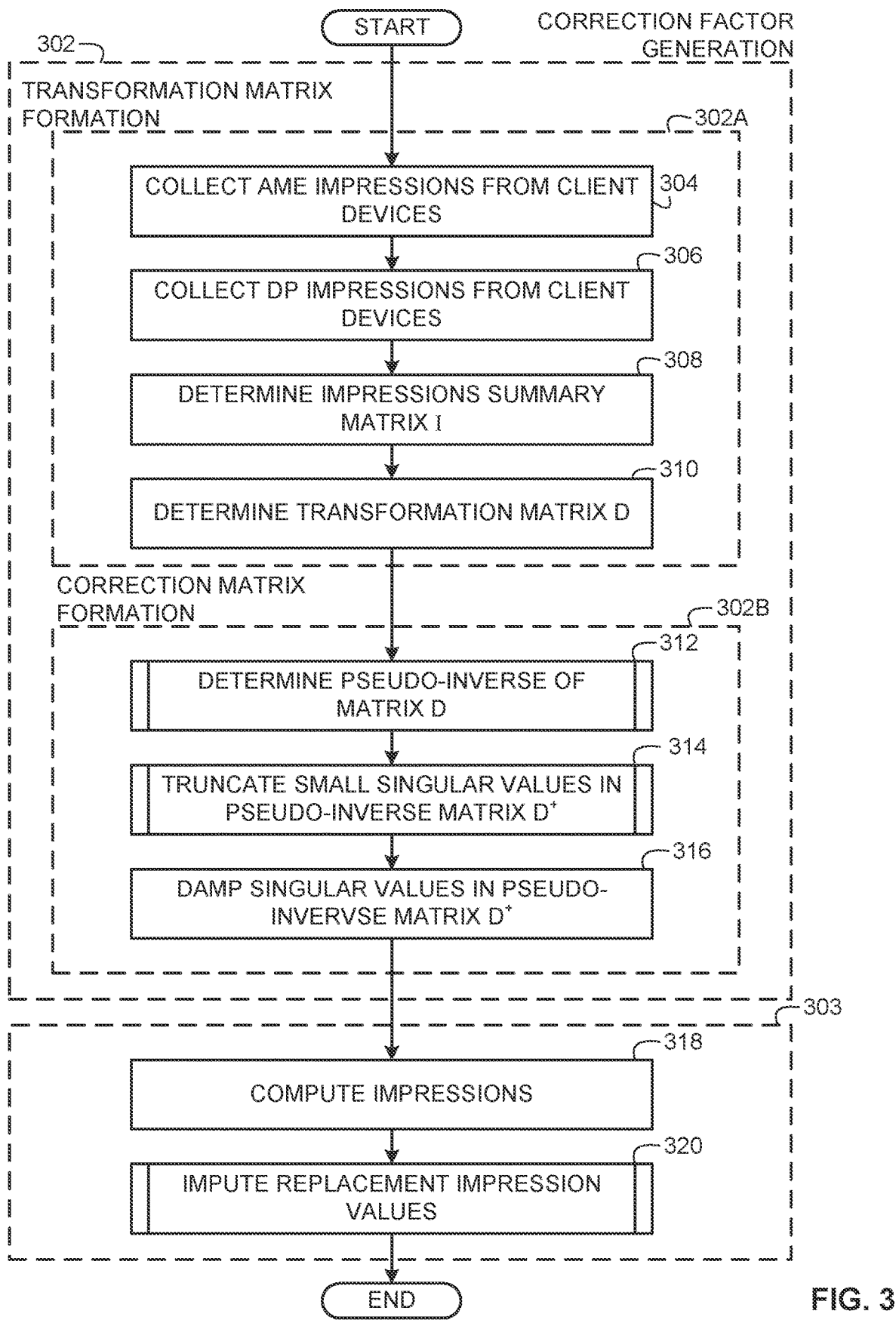
FIG. 3-6 are flow diagrams representative of example machine readable instructions that may be executed to implement the misattribution corrector of FIG. 2 to determine misattribution correction factors.

The example flow diagram of FIG. 3 is shown as two phases including an example correction factor generation phase 302, and an example correction phase 303. During the transformation matrix formation phase 302, the misattribution corrector 202 (FIG. 2) forms a transformation matrix (block 302A), and forms a correction matrix (block 302B). During the correction phase 303, the misattribution corrector 202 corrects the DP impression data collected by the DP 116 (and/or one or more other DPs) and stored in the DP impressions datastore 238. In some examples, the correction factor generation phase 302 (including one or both of the blocks 302A and 302B) and the correction phase 303 may be implemented as part of a same program. In other examples, the correction factor generation phase 302 (including one or both of the blocks 302A and 302B) and the correction phase 303 may be implemented as separate programs.

The example correction factor generation phase 302 of FIG. 3 begins at block 304 at which the AME impressions collector 218 collects impression data from the client device 102, and stores the impression data in the AME impressions datastore 232. For example, the AME impressions collector 218 collects impressions using the techniques described above in connection with FIG. 2. The DP impressions collector 230 obtains development impression records data from the DP 116 that correspond to AME panelists that are also subscribers of the DP 116, and stores the DP impressions data in the DP impressions datastore 238 (block 306). The correction factor generator 234 or, more generally, the misattribution corrector 202 determines an impressions summary matrix I (block 308), and determines the transformation matrix D (block 310) based on the impression data from the client device 102 and the impression records data from the DP 116. In some examples, the correction factor generator 234, or more generally, the misattribution corrector 202 determines an impressions summary matrix I and determines the transformation matrix D based on survey responses collected at the client device 102. For example, the survey responses describe user online media access habits. The transformation matrix D is constructed by dividing each impression of matrix I by the summation of the impression data of the corresponding matrix column. For example, the correction factor generator 234 or, more generally, the misattribution corrector 202 may use example Equation (1) below to construct each impression of transformation matrix D.

$$p(i|j) = \frac{n_{i,j}}{\sum_j n_{i,j}} \qquad \text{Equation (1)}$$

In the illustrated example of Equation (1), the variable "j" represents truth impression data collected on the client device 102 by the AME impressions collector 218, and stored in the AME impressions datastore 232. The variable "i" in the illustrated example of Equation (1) represents provider impression data collected from the DP 116 by the DP impressions collector 230, and is stored in the DP impressions datastore 238. The variable "n" of Equation (1) represents each impression count included in the impressions summary matrix I.

The example correction factor generator 234 or, more generally, the example misattribution corrector 202 determines a pseudo-inverse of the transformation matrix D to form a pseudo-inverse matrix D$^+$ (block 312), truncates singular values of the pseudo-inverse matrix D$^+$ having values less than a threshold (block 314), and damps (e.g., reduces the value of) other singular values of the pseudo-inverse matrix D$^+$ (block 316). The pseudo-inverse matrix D$^+$ is a generalization of the inverse matrix D that satisfies four criteria (DD$^+$D=D, D$^+$DD$^+$=D$^+$, (DD$^+$)'=DD$^+$, (D$^+$D)'=D$^+$D). In some examples, Equation (2) below (singular value decomposition (SVD)) is used to form the pseudo-inverse matrix D$^+$.

$$D^+ = V\Sigma^+ U^T \qquad \text{Equation (2)}$$

In the illustrated example of Equation (2), the variables "V" and "U" are orthogonal matrices. In Equation (2), $\Sigma^+$ is the pseudo-inverse of the diagonal matrix $\Sigma$ with non-negative elements. The diagonal elements of matrix $\Sigma$ are called singular values ($\sigma_i$). The pseudo-inverse of matrix $\Sigma$ ($\Sigma^+$) is formed by replacing every non-zero diagonal entry (e.g., singular value) by its reciprocal (e.g., $1/\sigma_i$) and transposing the resulting matrix.

In disclosed examples, the corrector 236 or, more generally, the misattribution corrector 202 computes corrected DP impressions by multiplying vectors of DP impression data by the truncated and damped pseudo-inverse matrix D$^+$ to form at least partially corrected DP impression values (block 318). Any impressions that are deemed to be improper, invalid, etc. (e.g., less than zero) may be replaced with impression values imputed based on others of the corrected impression values (block 320).

Figure 4:
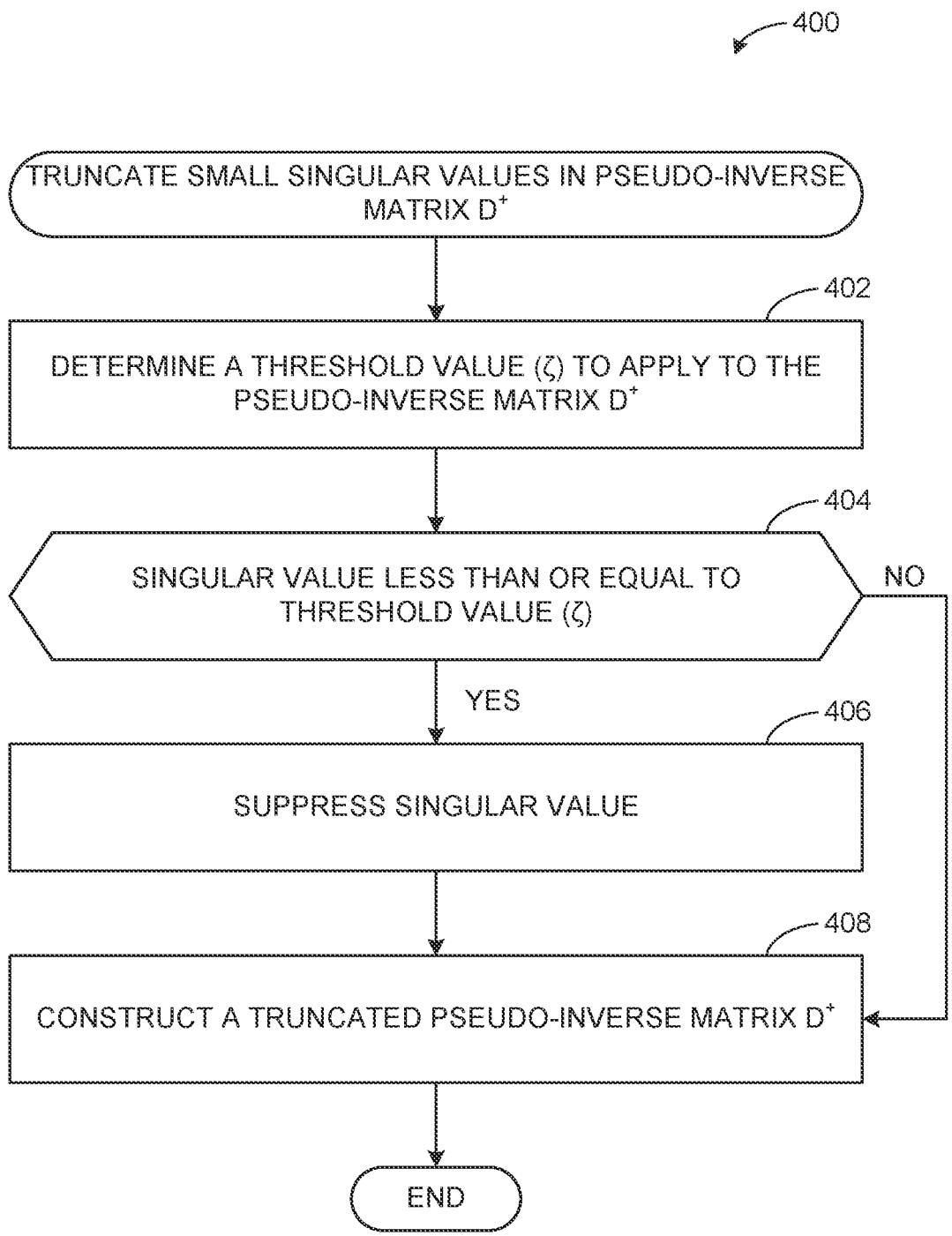

FIG. 4 is an example flow diagram representative of machine readable instructions 400 that may be executed to implement the misattribution corrector 202 of FIG. 2 to truncate small singular values of the pseudo-inverse matrix D$^+$ (block 314 of FIG. 3). The correction factor generator 234 determines a threshold value ($\zeta$) to apply to the pseudo-inverse matrix D$^+$ (block 402). In some examples, the correction factor generator 234 may use bias versus variance to determine the threshold value ($\zeta$). In the disclosed example, the applied threshold value ($\zeta$) is 0.001. Alternatively, the threshold value ($\zeta$) can be any value that would result in one or more singular vectors to be suppressed (e.g., truncated).

At block 404, the example correction factor generator 234 determines whether the singular value is less than or equal to the threshold value ($\zeta$). If, at block 404, the example correction factor generator determines that the singular value is greater than the threshold value ($\zeta$) (e.g., greater than 0.001), then $\Sigma^+$ of Equation (2) is equal to the reciprocal of the singular value (e.g., $$\frac{1}{\sigma_i}$$

and control proceeds to block 408 to construct a truncated pseudo-inverse matrix D$^+$. If at block 404, the example correction factor generator 234 determines that the singular value is less than or equal to the threshold value ($\zeta$), then, at block 406, $\Sigma^+$ of Equation (2) equals zero and thus, suppresses the singular value. At block 408, the example correction factor generator 234 constructs a truncated pseudo-inverse matrix D$^+$. For example, the correction factor generator 234 suppresses singular vectors whose singular values are small (e.g., less than or equal to 0.001) and does not suppress singular vectors whose singular values are greater than the applied threshold value ($\zeta$), resulting in a truncated pseudo-inverse matrix D$^+$. Truncation often results in a high noise component of the pseudo-inverse matrix D$^+$ and thus, further matrix regularization is disclosed in FIG. 5 below to correct misattribution in collected impressions.

Figure 5:
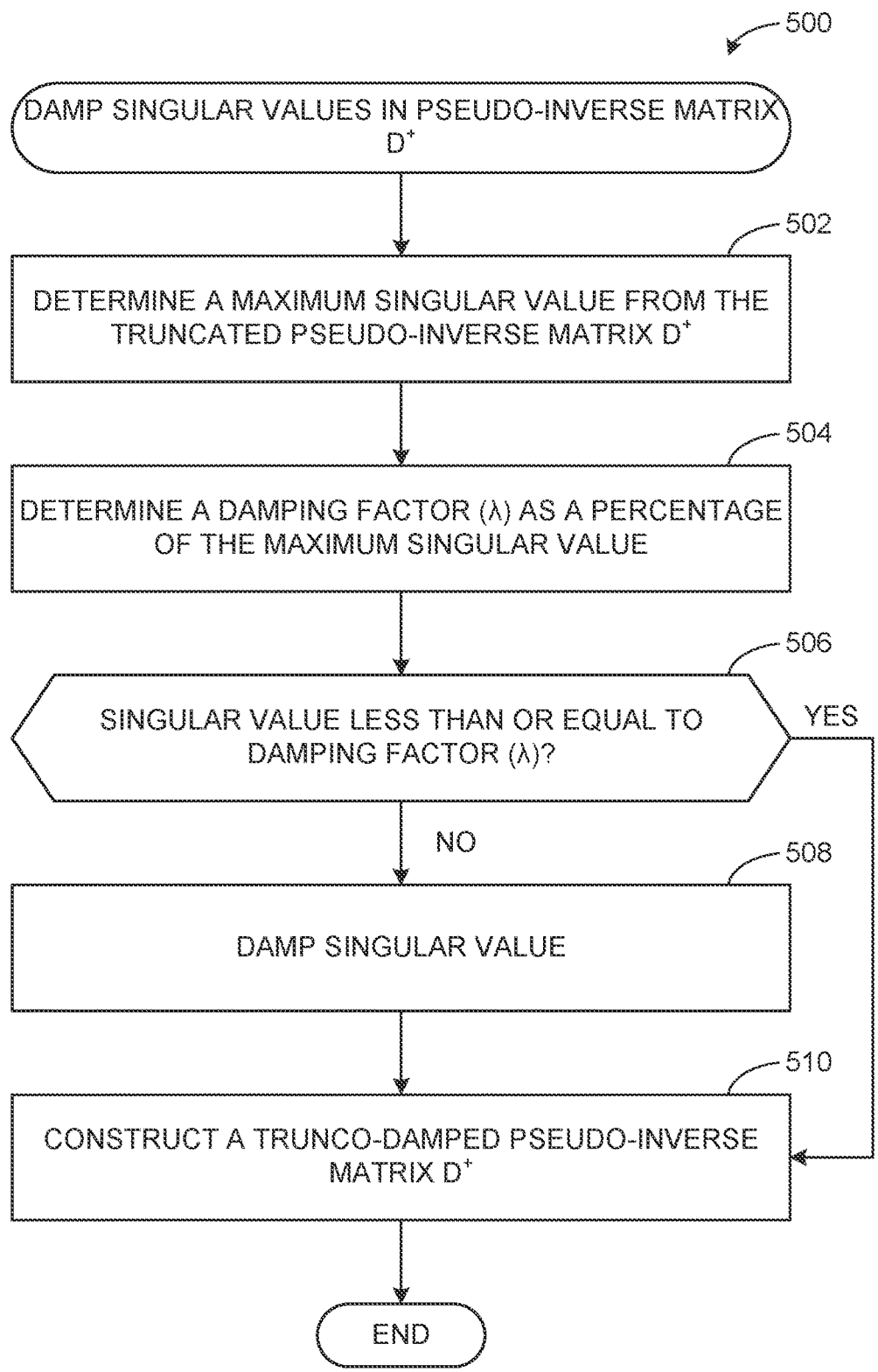

FIG. 5 is an example flow diagram representative of machine readable instructions 500 that may be executed to implement the misattribution corrector 202 of FIG. 2 to damp singular values in the pseudo-inverse matrix D$^+$ (generated at block 316 of FIG. 3). At block 502, the example correction factor generator 234 determines a maximum singular value ($\sigma_{max}$) from the pseudo-inverse matrix D$^+$. At block 504, the correction factor generator 234 determines a damping factor ($\lambda$) as a percentage of the maximum singular value ($\sigma_{max}$). In the disclosed example, the damping factor ($\lambda$) is 1% of the maximum singular value ($\sigma_{max}$). Alternatively, in other examples, the damping factor ($\lambda$) may be any percentage of the maximum singular value ($\sigma_{max}$) that tunes (e.g., damps, smoothens, etc.) the remaining singular values from the truncated pseudo-inverse matrix D$^+$ without truncating them.

At block 506, the example correction factor generator 234 determines whether the singular value is less than or equal to the damping factor ($\lambda$). If, at block 506, the correction factor generator 234 determines that the singular value is less than or equal to the damping factor ($\lambda$) (e.g., less than or equal to 1% of the maximum singular value ($\sigma_{max}$)), then $\Sigma^+$ of Equation (2) is equal to zero and control proceeds to block 510 to construct a trunco-damped pseudo-inverse matrix D$^+$. If, at block 506, the example correction factor generator 234 determines that the singular value is greater than the damping factor ($\lambda$) then, at block 508, $\Sigma^+$ of Equation (2) equals $$\left(\frac{\sigma_i}{\sigma_i^2 + \lambda^2}\right)$$

and the singular value is damped to reduce the high noise component as a result of the truncation disclosed above. At block 510, the example correction factor generator 234 constructs a trunco-damped pseudo-inverse matrix D$^+$. For example, the correction factor generator 234 damps the remaining singular values whose magnitude is greater than the damping factor ($\lambda$) and thus, resulting in a trunco-damped pseudo-inverse matrix D$^+$.

Figure 6:
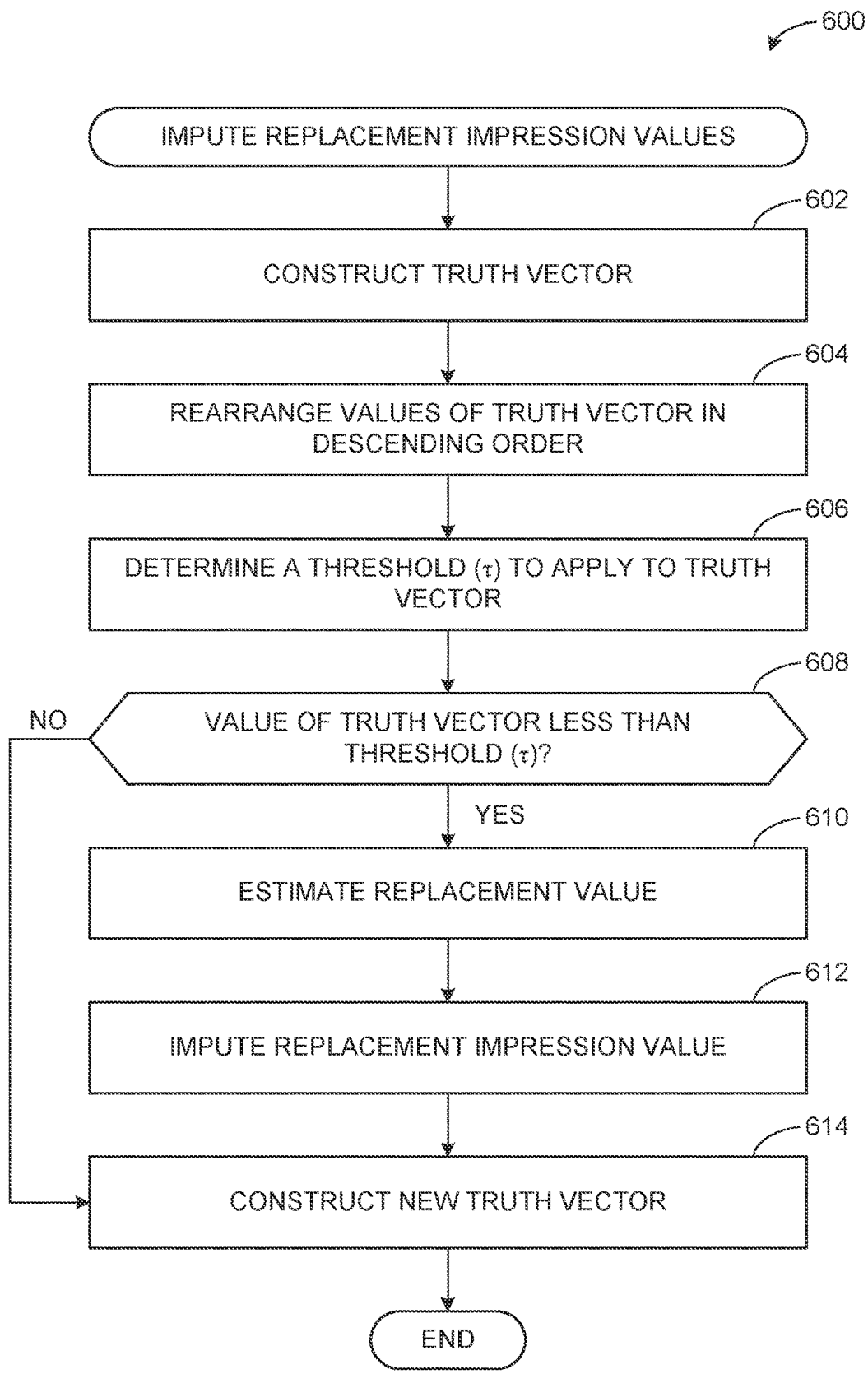

FIG. 6 is an example flow diagram representative of machine readable instructions 600 that may be executed to implement the misattribution corrector 202 of FIG. 2 to impute replacement impression values. At block 602, the example corrector 236 constructs a truth vector $\vec{t}$. For example, the corrector 236 may multiply the matrix 240 by a vector $\vec{d}$ of DP impression data from the DP impressions datastore 238 to form a vector $\vec{t}$ of corrected impression data 242. At block 604, the corrector 236 rearranges the values of the truth vector $\vec{t}$ in descending order. At block 606, the corrector 236 determines a threshold ($\tau$) to apply to the truth vector $\vec{t}$.

At block 608, the corrector 236 determines whether an impression value of the truth vector $\vec{t}$ is less than the threshold ($\tau$). If, at block 608, the corrector determines that the impression value of the truth vector $\vec{t}$ is greater than or equal to the threshold ($\tau$), then the impression value is considered accurate and control proceeds to block 614 to construct a new truth vector $\vec{t}$. If, at block 608, the corrector 236 determines that the impression value of the truth vector $\vec{t}$ is less than the threshold ($\tau$), then at block 610, the corrector 236 estimates a replacement impression value. In some examples, the corrector 236 uses extrapolation from known impressions (e.g., AME impressions collected using a panel) to estimate the impression value of the truth vector $\vec{t}$. In the disclosed example, the corrector 236 replaces the impression value of the truth vector $\vec{t}$ with a random number from a Gaussian distribution about the threshold ($\tau$). At block 612, the corrector 236 imputes the estimated replacement impression value into the truth vector $\vec{t}$. Then, at block 614, the corrector 236 constructs a new truth vector $\vec{t}$ including the replacement impression value(s).

Figure 7:
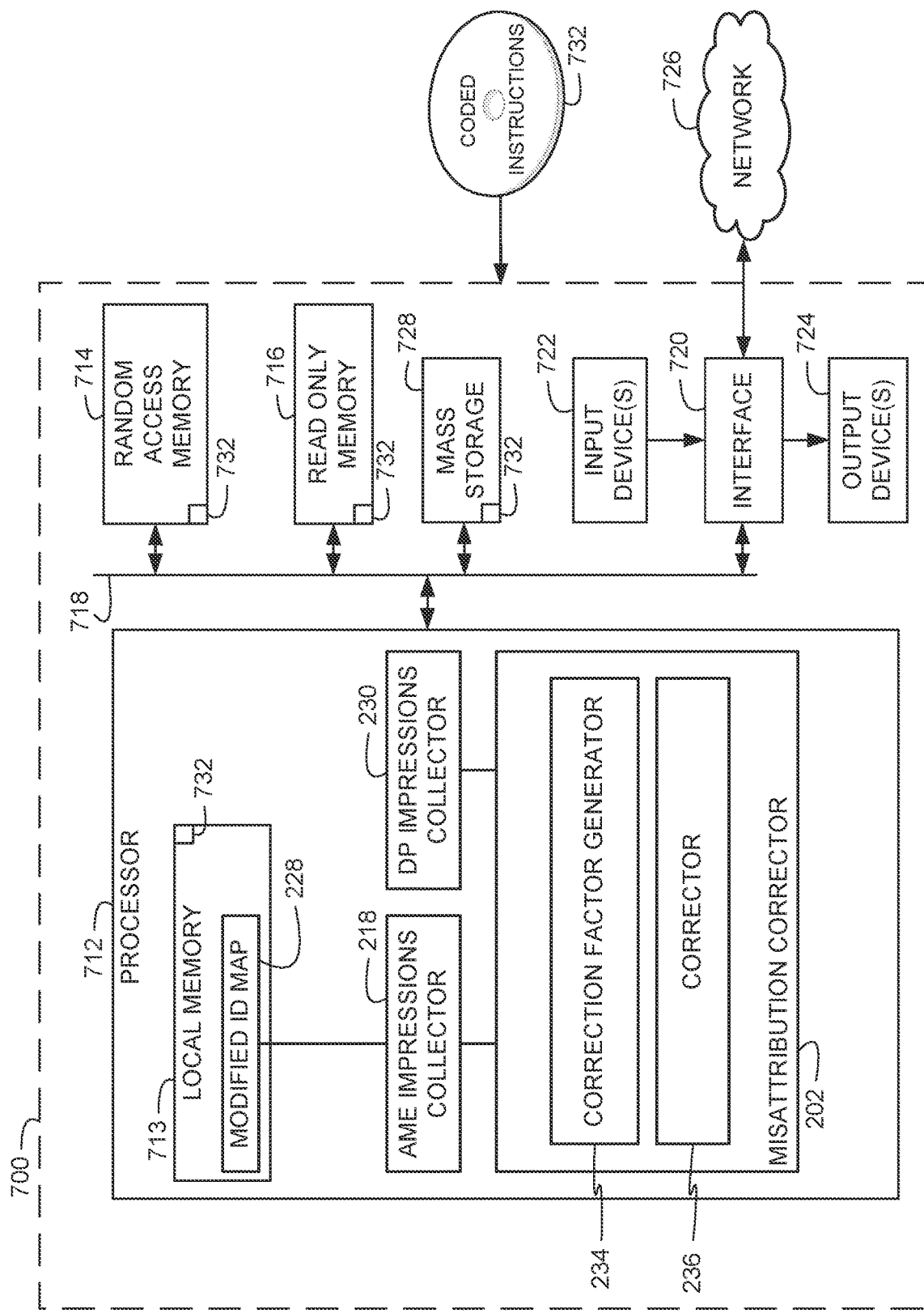
FIG. 7 illustrates an example processor system structured to execute the example instructions of FIGS. 3-6 to implement the example AME of FIGS. 1 and/or 2.

FIG. 7 is a block diagram of an example processor platform 700 configured to execute the instructions of FIG. 7 to implement the misattribution corrector 202 of FIG. 2. The processor platform 700 can be, for example, a server, a personal computer, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

In the illustrated example, the processor 712 implements the example misattribution corrector 202, the example AME impressions collector 218, the example AME impressions datastore 232, the example DP impressions collector 230, the example DP impressions datastore 238, the correction factor generator 234, and/or the corrector 236 described above in connection with FIGS. 2-6.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

In the illustrated example, any one or more of the local memory 713, the random access memory 714, the read only memory 716, and/or a mass storage device 728 may store the example datastores 232 and/or 238.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 include the machine readable instructions of FIG. 3 and may be stored in the mass storage device 728, in the volatile memory 714, in the non-volatile memory 716, and/or on a removable tangible computer readable storage medium such as a CD or DVD.

From the foregoing, it will be appreciate that methods, apparatus and articles of manufacture have been disclosed which enhance the operations of a computer to improve the accuracy of impression-based data such as unique audience and impression counts so that computers and processing systems therein can be relied upon to produce audience analysis information with higher accuracies. In some examples, computer operations can be made more efficient based on the above equations and techniques for determining misattribution correction factors. That is, through the use of these processes, computers can operate more efficiently by relatively quickly determining parameters and applying those parameters through the above disclosed techniques to determine the misattribution-corrected data. For example, using example processes disclosed herein, a computer can more efficiently and effectively correct misattribution errors DP without using large amounts of network communication bandwidth (e.g., conserving network communication bandwidth) and without using large amounts of computer processing resources (e.g., conserving processing resources) to communicate with individual online users to request survey responses about their online media access habits and without needing to solely rely on such survey responses from such online users. Survey responses from online users can be inaccurate due to inabilities or unwillingness of users to recollect online media accesses. Survey responses can also be incomplete, which could require additional processor resources to identify and supplement incomplete survey responses. As such, examples disclosed herein more efficiently and effectively determine misattribution-corrected data. Such misattribution-corrected data is useful in subsequent processing for identifying exposure performances of different media so that media providers, advertisers, product manufacturers, and/or service providers can make more informed decisions on how to spend advertising dollars and/or media production and distribution dollars.

Furthermore, example methods, apparatus, and/or articles of manufacture disclosed herein identify and overcome inaccuracies in impressions and/or aggregate impression-based data provided by DPs. For example, example methods, apparatus, and/or articles of manufacture disclosed herein overcome the technical problem of counting impressions and determining unique audiences of media on media devices that are shared by multiple people. Example methods, apparatus, and/or articles of manufacture disclosed herein solve this problem without forcing such media devices to be used by only a single person and without forcing people to always login to their subscriber accounts of DPs. By not forcing logins into DP accounts, examples disclosed herein do not force additional network communications to be employed, thus, reducing network traffic.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    obtaining first demographic-based impressions transmitted via a network in response to access to media by a first set of individuals;
    obtaining, from a database, second demographic-based impressions of the media accessed by a second set of individuals; and
    computing corrected demographic-based impressions by multiplying a vector of database proprietor impression data from the database by a pseudo-inverse matrix, wherein the database proprietor impression data comprises a computer-generated misattribution error in which an impression of the media from the database proprietor impression data is attributed to demographic data of a first individual despite a second individual, different from, and with different demographic data than, the first individual, having viewed the media in connection with the impression on a client device shared by the first individual and the second individual, and wherein computing the corrected demographic-based impressions comprises correcting the computer-generated misattribution error by attributing the impression of the media to the demographic data of the second individual.

2. The method of claim 1, further comprising replacing at least a portion of the first demographic-based impressions with the corrected demographic-based impressions.

3. The method of claim 1, further comprising forming the pseudo-inverse matrix determined based in part on the first demographic-based impressions.

4. The method of claim 1, further comprising generating the pseudo-inverse matrix based on a replacement of non-zero diagonal entries with a corresponding reciprocal value.

5. The method of claim 1, further comprising forming demographic-based impressions by applying a damping factor to the pseudo-inverse matrix, the damping factor being a percentage of a maximum singular value of the pseudo-inverse matrix.

6. The method of claim 1, further comprising:
    correcting an initial estimate of an audience size for the media based on the impression attributed to the demographic data of the second individual.

7. The method of claim 1, further comprising:
    communicating over a network with a plurality of meter devices located at panelist households to obtain impression data representative of impressions of the media presented at the panelist households; and
    logging the first demographic-based impressions based on the impression data obtained from the plurality of meter devices.

8. An apparatus, comprising:
    a processor; and
    a non-transitory computer-readable storage medium, having stored thereon program instructions that, upon execution by the processor, cause performance of a set of operations comprising:
        obtaining first demographic-based impressions transmitted via a network in response to access to media by a first set of individuals;
        obtaining, from a database, second demographic-based impressions of the media accessed by a second set of individuals; and
        computing corrected demographic-based impressions by multiplying a vector of database proprietor impression data from the database by a pseudo-inverse matrix, wherein the database proprietor impression data comprises a computer-generated misattribution error in which an impression of the media from the database proprietor impression data is attributed to demographic data of a first individual despite a second individual, different from, and with different demographic data than, the first individual, having viewed the media in connection with the impression on a client device shared by the first individual and the second individual, and wherein computing the corrected demographic-based impressions comprises correcting the computer-generated misattribution error by attributing the impression of the media to the demographic data of the second individual.

9. The apparatus of claim 8, the set of operations further comprising replacing at least a portion of the first demographic-based impressions with the corrected demographic-based impressions-values.

10. The apparatus of claim 8, the set of operations further comprising forming the pseudo-inverse matrix determined based in part on the first demographic-based impressions.

11. The apparatus of claim 8, the set of operations further comprising generating the pseudo-inverse matrix based on a replacement of non-zero diagonal entries with a corresponding reciprocal value.

12. The apparatus of claim 8, the set of operations further comprising forming demographic-based impressions by applying a damping factor to the pseudo-inverse matrix, the damping factor being a percentage of a maximum singular value of the pseudo-inverse matrix.

13. The apparatus of claim 8, the set of operations further comprising:
    correcting an initial estimate of an audience size for the media based on the impression attributed to the demographic data of the second individual.

14. The apparatus of claim 8, the set of operations further comprising:
    communicating over a network with a plurality of meter devices located at panelist households to obtain impression data representative of impressions of the media presented at the panelist households; and
    logging the first demographic-based impressions based on the impression data obtained from the plurality of meter devices.

15. A non-transitory computer-readable storage medium, having stored thereon program instructions that, upon execution by a processor, cause performance of a set of operations comprising:

obtaining first demographic-based impressions transmitted via a network in response to access to media by a first set of individuals;

obtaining, from a database, second demographic-based impressions of the media accessed by a second set of individuals; and computing corrected demographic-based impressions by multiplying a vector of database proprietor impression data from the database by a pseudo-inverse matrix, wherein the database proprietor impression data comprises a computer-generated misattribution error in which an impression of the media from the database proprietor impression data is attributed to demographic data of a first individual despite a second individual, different from, and with different demographic data than, the first individual, having viewed the media in connection with the impression on a client device shared by the first individual and the second individual, and wherein computing the corrected demographic-based impressions comprises correcting the computer-generated misattribution error by attributing the impression of the media to the demographic data of the second individual.

16. The non-transitory computer-readable storage medium of claim 15, the set of operations further comprising replacing at least a portion of the first demographic-based impressions with the corrected demographic-based impressions.

17. The non-transitory computer-readable storage medium of claim 15, the set of operations further comprising forming the pseudo-inverse matrix determined based in part on the first demographic-based impressions.

18. The non-transitory computer-readable storage medium of claim 15, the set of operations further comprising generating the pseudo-inverse matrix based on a replacement of non-zero diagonal entries with a corresponding reciprocal value.

19. The non-transitory computer-readable storage medium of claim 15, the set of operations further comprising:

correcting an initial estimate of an audience size for the media based on the impression attributed to the demographic data of the second individual.

20. The non-transitory computer-readable storage medium of claim 15, the set of operations further comprising:

communicating over a network with a plurality of meter devices located at panelist households to obtain impression data representative of impressions of the media presented at the panelist households; and logging the first demographic-based impressions based on the impression data obtained from the plurality of meter devices.

* * * * *